United States Patent
Matsunami et al.

(10) Patent No.: US 7,447,933 B2
(45) Date of Patent: Nov. 4, 2008

(54) FAIL-OVER STORAGE SYSTEM

(75) Inventors: Naoto Matsunami, Tokyo (JP); Kouji Sonoda, Tokyo (JP); Manabu Kitamura, Tokyo (JP); Takashi Oeda, Tokyo (JP); Yutaka Takata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 11/316,463

(22) Filed: Dec. 21, 2005

(65) Prior Publication Data

US 2006/0117211 A1 Jun. 1, 2006

Related U.S. Application Data

(63) Continuation of application No. 10/150,245, filed on May 15, 2002, now Pat. No. 7,003,687.

(30) Foreign Application Priority Data

Jan. 16, 2002 (JP) ............................. 2002-006873

(51) Int. Cl.
*G06F 11/00* (2006.01)
(52) U.S. Cl. .................. 714/4; 714/9; 714/11
(58) Field of Classification Search ............... 714/4, 714/9, 11
See application file for complete search history.

(56) References Cited

U.S. PATENT DOCUMENTS

| | | |
|---|---|---|
| 5,696,895 A | 12/1997 | Hemphill et al. |
| 5,774,640 A | 6/1998 | Kurio |
| 5,848,241 A | 12/1998 | Misinai et al. |
| 6,477,619 B1 | 11/2002 | Fujimoto et al. |
| 6,553,408 B1 | 4/2003 | Merrell et al. |
| 6,725,106 B1 | 4/2004 | Covington et al. |
| 6,779,063 B2 | 8/2004 | Yamamoto |
| 6,792,507 B2 | 9/2004 | Chiou et al. |
| 6,810,462 B2 | 10/2004 | Matsunami et al. |
| 2002/0178143 A1 | 11/2002 | Fujimoto |

(Continued)

FOREIGN PATENT DOCUMENTS

JP 06-282385 A 10/1994

(Continued)

OTHER PUBLICATIONS

Japan Patent Office (JPO) office action dated Feb. 20, 2007 for JPO patent application JP2002-006873.

*Primary Examiner*—Michael C Maskulinski
(74) *Attorney, Agent, or Firm*—Townsend and Townsend and Crew LLP

(57) ABSTRACT

A storage system 1 including multiple slots for loading a block I/O interface controller, a file I/O interface controller, and any other kinds of interface controllers that are combined freely. The storage system 1 includes a management table that manages fail-over-enabled devices by grouping those devices in accordance with the interface type and the domain to which each device belongs; an information table that directs a fail-over procedure; and fail-over controlling means that takes over the processing of a failed interface controller belonging to a fail-over-enabled group. The fail-over system offers several modalities for monitoring failures, selecting takeover controllers and restoring functionality. Storage system 1 solves conventional problems by providing a system that can mount a plurality of file systems, and that resists multiple failures detected in a fail-over server.

6 Claims, 11 Drawing Sheets

U.S. PATENT DOCUMENTS

| | | |
|---|---|---|
| 2003/0023784 A1 | 1/2003 | Matsunami et al. |
| 2004/0139168 A1 | 7/2004 | Tanaka et al. |
| 2004/0153740 A1 | 8/2004 | Fujimoto |
| 2004/0230720 A1 | 11/2004 | Kobayashi et al. |
| 2004/0233910 A1 | 11/2004 | Chen et al. |

FOREIGN PATENT DOCUMENTS

| | | |
|---|---|---|
| JP | 11-39103 A | 2/1999 |
| JP | 2000-276306 A | 10/2000 |
| JP | 2001-325207 A | 11/2001 |

FIG.7

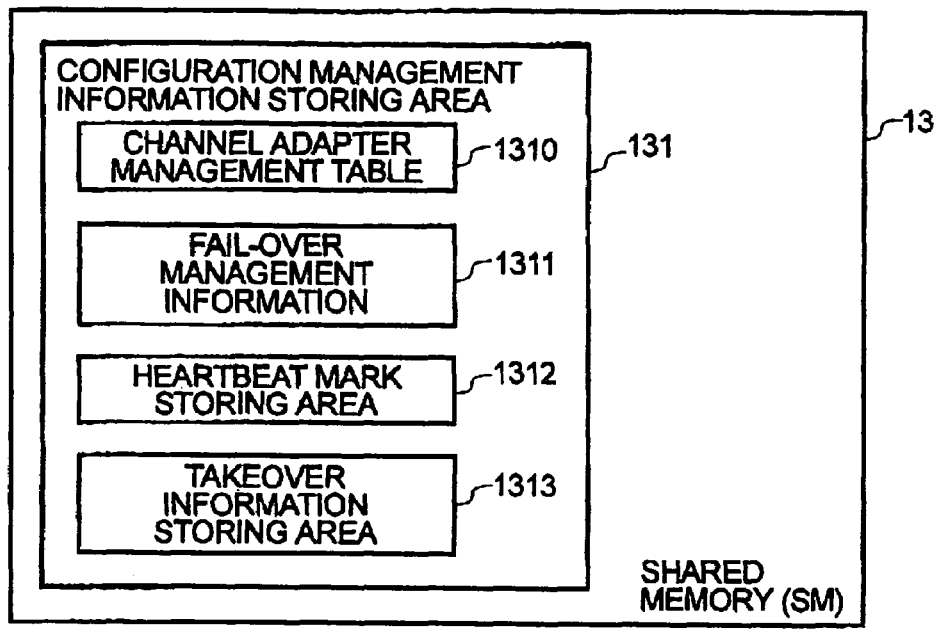

FIG.8

| CHANNEL ADAPTER | PHYSICAL I/F GROUP | LOGICAL I/F GROUP | DOMAIN | FAIL-OVER GROUP | STATUS | OPER-ATING RATIO |
|---|---|---|---|---|---|---|
| CHN0 | Ethernet | NAS | DOM-LAN0 | FOG-LN0 | Normal | 48% |
| CHN1 | Ethernet | NAS | DOM-LAN0 | FOG-LN0 | Failed | 0% |
| CHN2 | Ethernet | NAS | DOM-LAN0 | FOG-LN0 | Failed | 0% |
| CHN3 | Ethernet | NAS | DOM-LAN0 | FOG-LN0 | Normal TakingOver(CHN1) TakingOver(CHN2) | 86% |
| CHN4 | Ethernet | NAS | DOM-LAN1 | FOG-LN1 | Normal | 32% |
| CHN5 | Ethernet | NAS | DOM-LAN1 | FOG-LN1 | Normal | 12% |
| CHF0 | Fibre Channel | FCP | DOM-FC0 | FOG-FC0 | Normal | 74% |
| CHF1 | Fibre Channel | FCP | DOM-FC0 | FOG-FC0 | Normal | 39% |

FAIL-OVER STORAGE SYSTEM

CROSS-REFERENCES TO RELATED APPLICATIONS

The present application is a Continuation Application of U.S. application Ser. No. 10/150,245, filed May 15, 2002, which in turn is related to and claims priority from Japanese Patent Application No. 2002-006873, filed Jan. 16, 2002, both of which are incorporated by reference herein in their entirety for all purposes.

BACKGROUND OF THE INVENTION

1. Field of the Invention

The present invention relates to fail-over storage systems employed for computer systems. More particularly, the present invention relates to fail-over storage systems provided with a plurality of input/output interfaces.

2. Background of the Invention

Interfaces (I/F) used between storage systems and computers are roughly classified into two types. The first type is the "block I/O interface." This interface enables data input/output (I/O) in blocks, a block being a unit of data management of storage units. The fiber channel, the SCSI (Small Computer Systems Interface), the Mainframe channel, etc., belong to this "block I/O interface" type. Multiple computers are often connected to multiple storage systems by such block I/O interfaces in systems. The systems are referred to as a storage area network (SAN). Fiber channels are usually used to interconnect a SAN.

The second type of interface is the "file I/O interface." This type of interface enables data I/O in files. Interfaces that enable data I/O by using the Network File System, a protocol used to transfer files between file servers and client servers, are file I/O interfaces. A storage system provided with this type of file I/O interface and capable of connecting a network, including a local area network (LAN), is referred to as a network attached storage (NAS) system.

A conventional technique, disclosed in U.S. Pat. No. 5,696,895, referred to as the fail-over technique assures the resistance of file servers to failures. Specifically, the technique enables "heartbeat" signals to be exchanged between a first server that uses a first storage system and a second server that uses a second storage system. If a failure occurs in the first server, the "heartbeat" signal stops. The second server detects the absence of signal and accesses the first storage system used by the first server to take over the processing of the first server (fail-over processing).

BRIEF SUMMARY OF THE INVENTION

According to the above-described conventional technique, if someone wants a computer system which includes a SAN function and a NAS function, it is necessary to prepare the SAN storage system and the NAS storage system independently to make use of both the SAN and NAS functionalities. Consequently, each of those storage systems needs to be managed individually, increasing the system management cost.

Usually, the conventional NAS storage system is composed of a file server and a storage system with the file server attached to a storage system as a host computer. The conventional fail-over technique considers a failure that might occur in the file server of the NAS storage system., but it does not consider any failure that might occur in the storage system of the NAS. Furthermore, the conventional fail-over technique gives no consideration to any failure that might occur in the storage system that performs the fail-over processing (resistance to multiple failures). In addition, the conventional technique does not provide for a storage system capable of connecting multiple network domains, nor to the fail-over processing executable in that configuration. Under the circumstances, one feature of the present invention is to provide a storage system that can reduce system management cost by managing numerous system interfaces collectively. In addition, the present invention provides a storage system resistant to multiple failures and capable of connecting many network domains.

To provide these features, the storage system of the preferred embodiment includes multiple slots used for various interface controllers such as a block I/O interface controller or a file I/O interface controller, and multiple disk controllers used to control various disk drives to be accessed from those interface controllers. Other and further objects, features and advantages of the invention will appear more fully from the following description.

BRIEF DESCRIPTION OF THE DRAWINGS

A preferred form of the present invention is illustrated in the accompanying drawings in which:

FIG. 7 is an internal block diagram of shared memory;

FIG. 8 is a channel adapter management table;

DETAILED DESCRIPTION OF THE INVENTION

In a preferred embodiment of the present invention, each of the interface controllers is mounted as a board in the subject computer system and the shapes of all the controllers are the same so that they can be loaded in any of the slots. Furthermore, the above configuration of the storage system of the present invention, in another preferred embodiment, further includes a management table that manages fail-over interface controllers collectively, an information table that directs a fail-over procedure, and fail-over control means the taking-over of processing between interface controllers belonging to the same fail-over interface group according to the directed fail-over procedure.

Figure 1:
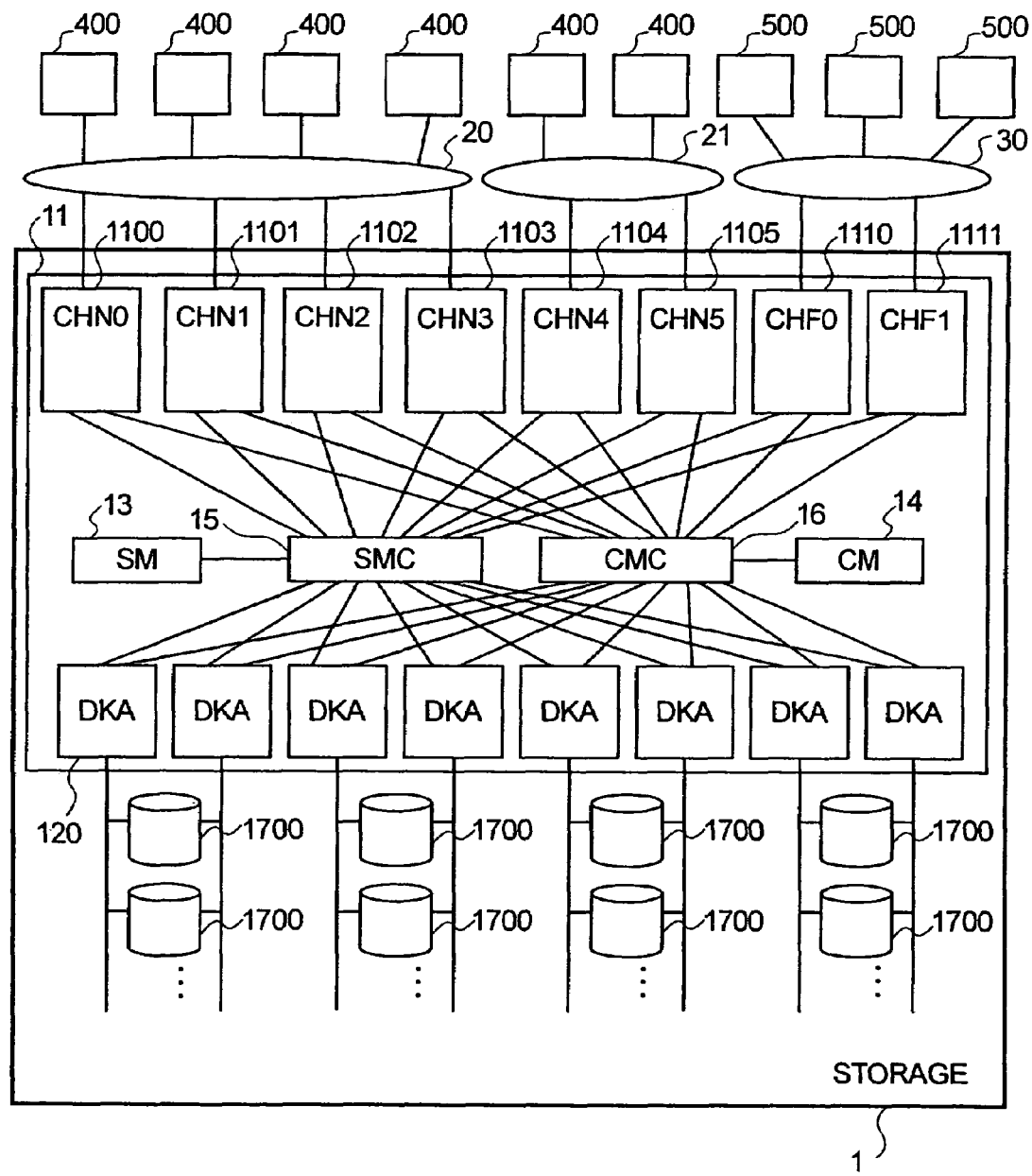
FIG. 1 is a block diagram of a storage system in an embodiment of the present invention.

FIG. 1 shows an embodiment of a storage system of the present invention. (Herein, "x" denotes an integer.) Storage system 1 includes a disk controller 11 and multiple storage units 1700. In the disk controller 11, NAS channel adapters (CHN) 1100-1105, are interface controllers connected to NAS clients 400 via a file I/O interface. Fiber channel adapters (CHF) 1110, 1111 are interface controllers connected to SAN clients 500 via a block I/O interface. Herein, CHN and CHF will be referred to as channel adapters. Each storage unit 1700 is connected to a disk adapter 120. Each disk adapter 120 (DKA) controls a storage unit 1700 connected thereto. Reference numeral 13 denotes a shared memory (SM); 14 denotes a cache memory (CM). A shared memory controller (SMC) 15 is connected to NAS channel adapters 1100-1105, fiber channel adapters 1110, 1111, disk adaptors 120, and shared memory 13. Shared memory controller 15 controls data transfer between NAS channel adapters 1100-1105 and fiber channel adapters 1110, 1111, as well as between disk adapters 120 and shared memory 13. A cache memory controller (CMC) 16 is connected to NAS channel adapters 1100-1105, fiber channel adapters 1110, 1111, disk adapters 120, and cache memory 14. Cache memory controller 16 controls data transfer between NAS channel adapters 1100-1105 and fiber channel adapters 1110, 1111, as well as between disk adapters 120 and cache memory 14.

The LANs 20 and 21 connect NAS channel adapters 1100-1105 to NAS clients 400. Generally, the IP network is used for the LANs. Different domains are assigned to LANs 20 and 21. Here, "domain" means a management range in a network. In this embodiment, DOM-LAN0 domain names are given to LAN 20 and DOM-LAN1 domain names are given to LAN 21. SAN 30 connects fiber channel adapters 1100-1105 to SAN clients 500. In this embodiment, a DOM-FC0 domain name is given to SAN 30.

In storage system 1, every channel adapter can access the cache memory 14 and every storage unit 1700 via cache memory controller 16. Storage system 1 is provided with both SAN and NAS interfaces. This embodiment enables multiple NAS channel adapters to be divided into groups and each of the groups to be connected to a LAN managed in a domain different from the others. Of course, storage system 1 may be provided with only SAN or NAS interfaces.

Figure 2:
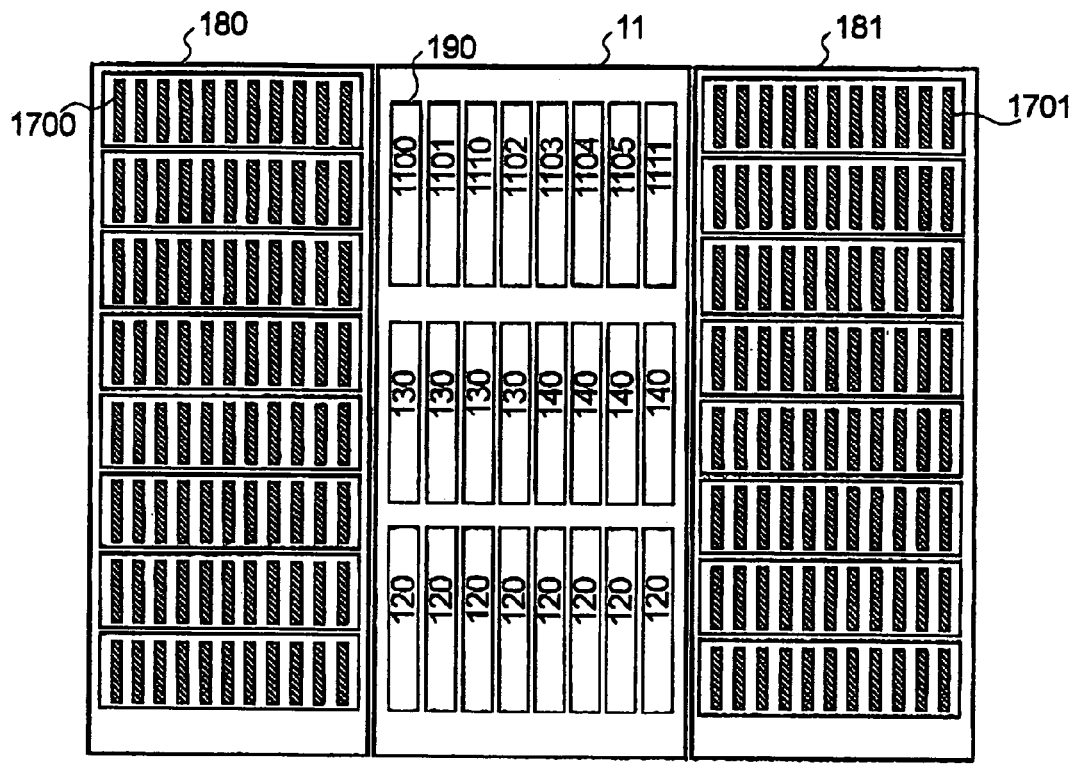
FIG. 2 is a schematic view of a storage system in the embodiment of the present invention.

FIG. 2 shows an external view of storage system 1. Disk controller 11 houses NAS channel adapters 1100-1105, fiber channel adapters 1110, 1111, disk adapters 120, shared memory 13 and cache memory 14. Disk units (DKU) 180 and 181 house storage units 1700, respectively. Shared memory 13 is actually composed of multiple controller boards 130, and cache memory 14 is composed of multiple cache boards 140. Boards 130 and 140 are loaded in slots 190. The user of storage system 1 increases/decreases the number of those boards to obtain a desired storage capacity. FIG. 2 shows how boards 130 and 140 are loaded in the respective slots 190 by fours.

Adapter boards that include a built-in NAS channel adapters 1100-1105 are also loaded in the slots 190. In this embodiment, the shape of slots 190, the size of the adapter boards, and the shape of the connectors are fixed among all the interfaces to make them compatible. Consequently, disk controller 11 can house any adapter boards in any slots 190 regardless of their interface types. The user of storage system 1 can choose a combination of a number of NAS channel adapters 1100-1105 and a number of fiber channel adapters 1110, 1111, and freely load them in slots 190 of storage system 1.

Figure 3:
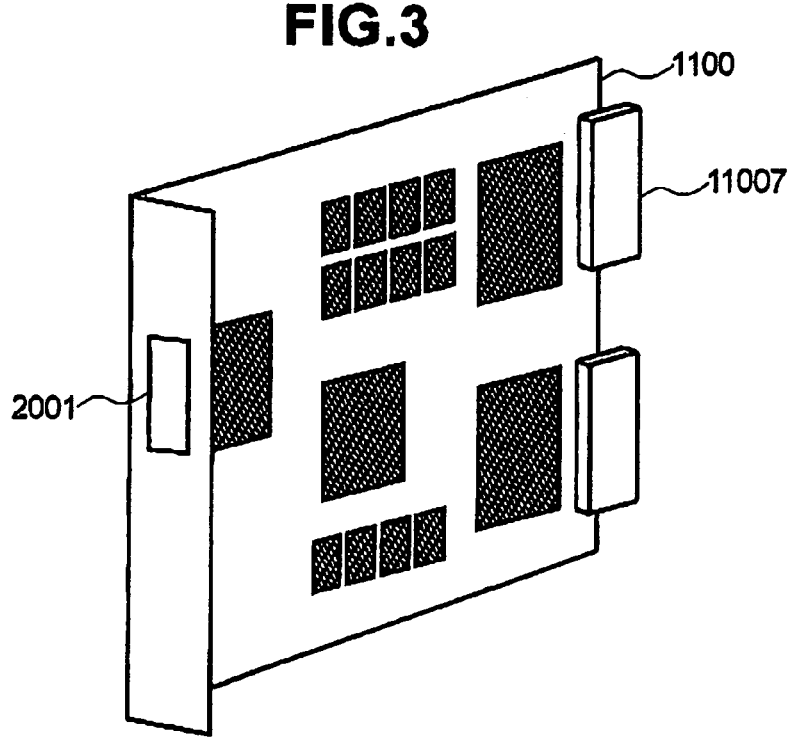
FIG. 3 is an external view of a channel adapter.

FIG. 3 shows a configuration of an adapter board that includes a built-in NAS channel adapter 1100. A connector 11007 is connected to a connector of a disk controller. In this embodiment, as described above, NAS channel adapter 1100 and fiber channel adapter 1110 or 1111 have the same configuration of connectors. An interface connector 2001 conforms to the IP network. When the adapter board is a fiber channel adapter 1110 or 1111, interface connector 2001 corresponds to a fiber channel.

Figure 4:
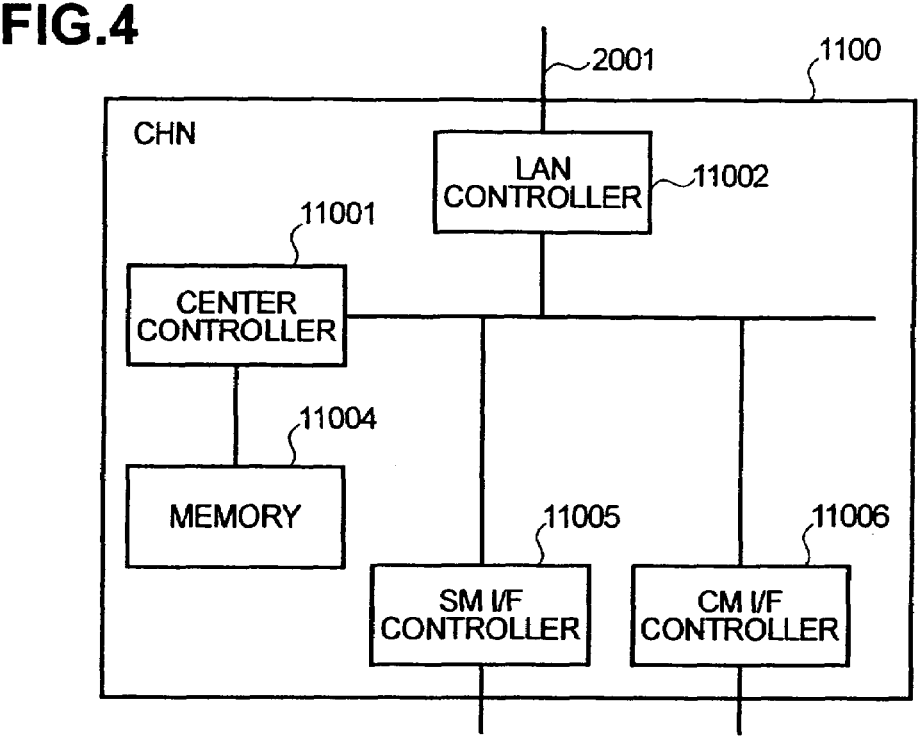
FIG. 4 is a block diagram of the channel adapter.

FIG. 4 is an internal block diagram of NAS channel adapter 1100. Reference numeral 11001 denotes a center controller. A LAN controller 11002 connects a LAN via interface connector 2001. Memory 1004 is connected to center controller 11001. Memory 11004 stores programs and control data to be executed by center controller 11001. A shared memory interface controller (SM I/F) 11005 controls access of NAS channel adapters 1100-1105 to shared memory 13. Cache memory interface controlling means 11006 controls access of the NAS channel adapters to cache memory 14.

Center controller 11001 may be a single processor or a set of processors. For example, center controller 11001 may be composed of symmetrical multiple processors used for the horizontal load distribution of control processing. The symmetrical multiple processors may be configured so that one processor employs the I/O interface protocol for processing and the other processor controls disk volumes. The configuration of fiber channel adapters 1110, 1111 is the same as that shown in FIG. 4 except that LAN controller 11002 is replaced with a fiber channel controller.

Figure 5:
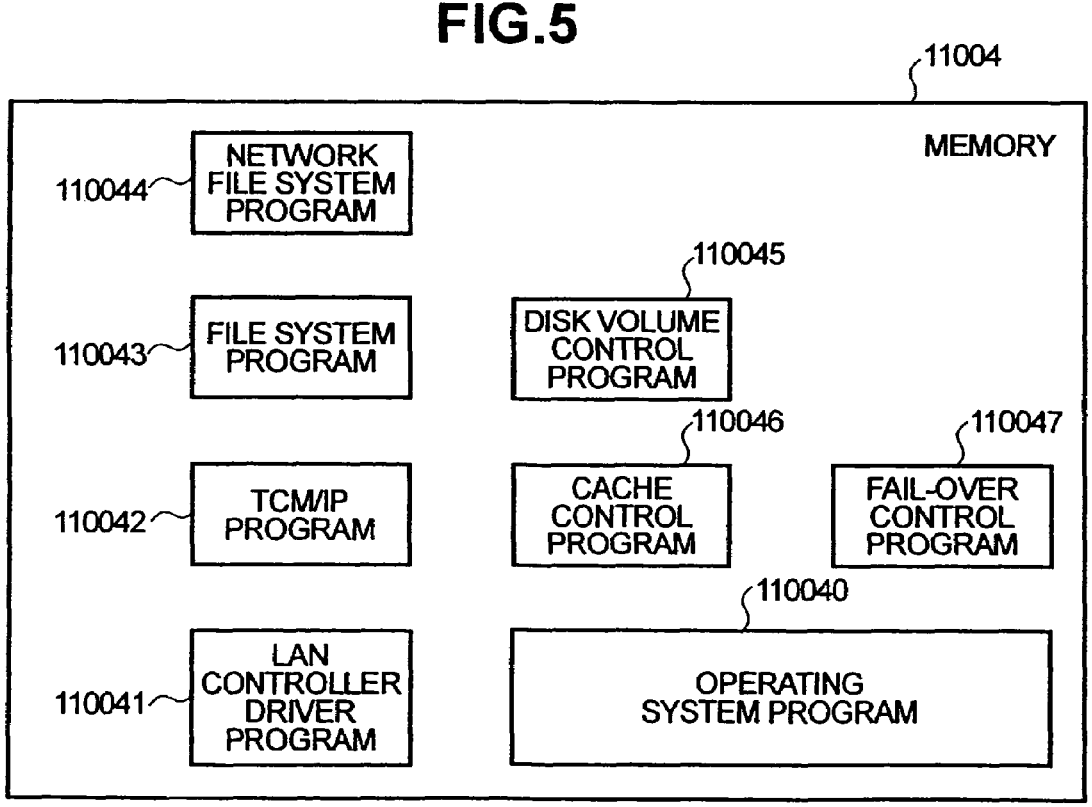
FIG. 5 is an internal block diagram of a memory of the channel adapter shown in FIG. 4.

FIG. 5 is a block diagram of memory 11004 of NAS channel adapters 1100-1105. An operating system program 110040 is used to manage all the programs and control the data I/O in the subject system. A LAN controller driver program 110041 is used to control LAN controller 11002 (shown in FIG. 4). A TCP/IP program 110042 is used to control the TCP/IP that is a LAN communication protocol. A file system program 110043 is used to manage files stored in the storage unit. A network file system program 110044 is used to control the protocols of Network File System used to supply files stored in the storage unit to NAS clients 400. A disk volume control program 110045 is used to control access to disk volumes set in the storage units 1700 (shown in FIGS. 1 and 2). A cache control program 110046 is used to manage the data in cache memory 14 (shown in FIGS. 1 and 2) and to control hit/miss decisions, etc. A fail-over program 110047 is used to control such processing as passing of processing from a NAS channel adapter that has failed to another normal NAS adapter. The fail-over program 110047 will be described more in detail later.

Next, the processing executed in storage system 1 is described. In this embodiment, the channel adapters of storage system 1 are managed in layers to make it easier to manage storage system 1. That is, the channel adapters are divided into four layers according to four indexes: physical interface, logical interface, domain, and fail-over group. The indexes are not limited to only those four, however.

Figure 6:
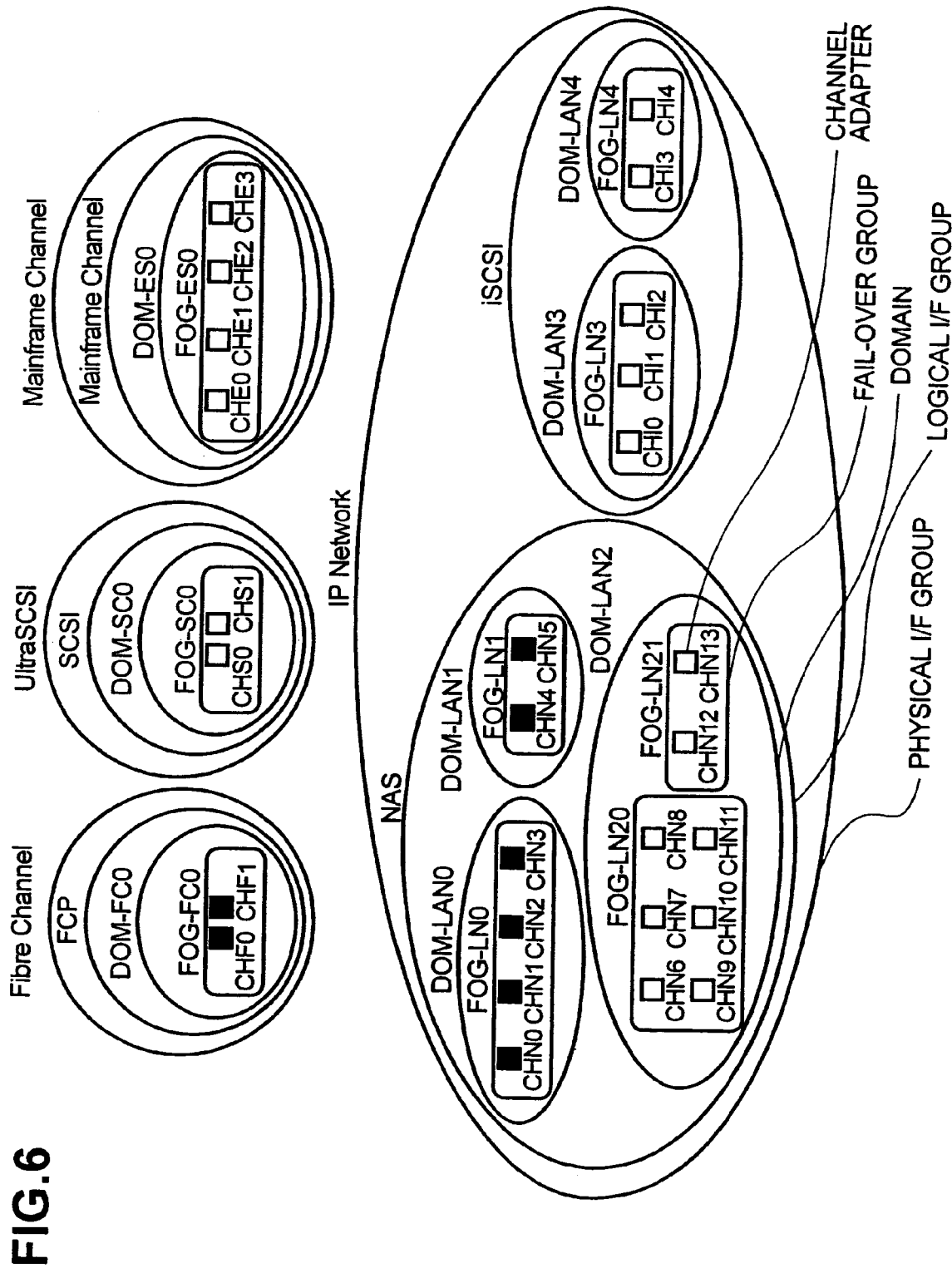
FIG. 6 is a concept chart for grouping channel adapters.

FIG. 6 shows an example of the channel adapters division into the four layers. In the figure, a shaded area denotes storage system 1. The outermost track denotes the physical interface layer. In this layer, channel adapters are grouped according to the physical medium of the interface by which each channel adapter is connected to the host. Specifically, channel adapters are grouped according to the four physical media of the fiber channel, the UltraSCSI, the Mainframe Channel, and the IP network.

The second track denotes the physical interface layer. In this layer, channel adapters are grouped according to the logical protocol of the interface by which each channel adapter is connected to the host. Specifically, channel adapters are grouped by the fiber channel protocol (FCP), the SCSI, the Mainframe Channel, and the NAS (that is, a file I/O interface), and the iSCSI logical protocol.

The third track denotes the domain layer. In this layer, channel adapters are grouped according to the assigned domain (an IP network domain [sub-net] for the IP network, one SCSI bus for the SCSI, and the whole SAN composed in one group or single address space for the fiber channel). The innermost track denotes the fail-over group layer. In this layer, channel adapters that are fail-over-enabled are grouped into one unit.

To perform a fail-over operation between channel adapters, address information must be exchanged between the channel adapters. Consequently, one and the same domain must be assigned to the channel adapters in a fail-over group. When the fail-over group is in the same domain, the group may be a single group, like the DOM-LAN0 domain, or two or more, like the DOM-LAN2 domain. The number of channel adapters in a fail-over group may be two, like FOG-LN1, or three or more, like FOG-LN0. Each innermost square denotes a channel adapter. In FIG. 6, there are a total of 27 channel adapters.

FIG. 7 is a block diagram of shared memory 13. This shared memory 13 stores management information used to manage channel adapters. A configuration management information storing area 131 stores management information that denotes the configuration of each item of the storage system, such as an interface. Configuration information storing area 131 includes a channel adapter management table 1310, fail-over management information 1311, a heartbeat mark storing area 1312, and a fail-over information storing area 1313.

FIG. 8 shows the contents of channel adapter management table 1310. The table 1310 is used to manage channel adapter groups. The tables shown in FIG. 8 are formed in accordance with the configuration of storage system 1. The channel adapter entry 13101 includes registered channel adapter identifiers. The physical interface group entry 13102 holds the physical interface group to which each registered channel adapter belongs. The logical interface group entry 13103 holds information about the logical interface group to which each registered channel adapter belongs. A domain entry 13104 holds information about the domain to which each registered channel adapter belongs. A fail-over group entry 13105 holds information about the fail-over group to which each registered channel adapter belongs. A status entry 13106 holds the status of each registered channel adapter (normal, abnormal, channel adapter for which a fail-over operation is done, etc.). An operating ratio entry 13107 holds information about the operating state of each registered channel adapter, particularly the operation ratio of each channel adapter.

FIG. 8 shows how the processing jobs of failed channel adapters CHN 1 and CHN 2 are taken over by a normal channel adapter CHN 3 in the same fail-over group (FOG-LN0) of the same domain (DON-LAN0). In this case, CHN 3 executes its own processing, as well as the processing of the two CHNs that have failed, so that the operating ratio of CHN 3 becomes as high as 86%.

Returning to the description of FIG. 7, heartbeat mark storing area 1312 stores state information about each channel adapter. Herein, the state information is sometimes referred to as a heartbeat mark. The heartbeat mark includes such data as NAS channel adapter identifier, normal code, updating time.

Takeover (See FIG. 7) information storing area 1313 holds the takeover-related information for each channel adapter, so that the processing of a failed channel adapter can be taken over by another channel adapter. The takeover information includes both MAC and IP addresses of LAN controller 11002, device information for file system 110043 or mount point information, and export information for network file system 110044.

Takeover information storing area 1313 stores information related to takeover processing between channel adapters, monitoring related information, specific channel adapter processing to be taken over (to be described later) and information about each channel adapter to be monitored, etc. Each of the above information items will be described more in detail with reference to FIGS. 12 through 14.

The operation of storage system 1 in this embodiment is now described, starting with a description of how storage system 1 operates when a failure is detected in a channel adapter. The "failure" mentioned here means an unrecoverable failure that occurs in a channel adapter whose processing must be taken over by a normal channel adapter. Here, the failed channel adapter is CH-A and the adapter that takes over the processing of CH-A is CH-B.

Where CH-A detects a failure by itself, the fail-over processing, the recovery processing, and the take-back processing are executed by the following procedure.

(1) CH-A finds the failure and executes a block-off processing. As a result, heartbeat mark updating of CH-A stops. The block-off processing means stopping a channel adapter operation.

(2) CH-B confirms that heartbeat mark updating of CH-A has stopped.

(3) CH-B takes over the processing of CH-A (fail-over).

(4) Recovery processing is executed for CH-A. Specifically, recovery processing means CH-A board replacement, repair, or other service by a maintenance worker. Storage system 1 executes recovery processing according to the reported failure content. For example, the report may be any of the messages displayed on the screen of the subject management terminal, a Simple Network Management Protocol (SNMP), an E-mail, a syslog, a pocket bell sound, an assisting notice (via a hot line to the center), etc.

(5) CH-A is recovered and heartbeat mark updating of CH-A restarts.

(6) CH-B confirms that heartbeat mark of CH-A has been updated.

(7) CH-A takes back the processing failed over to CH-B (taking-back).

Where CH-A cannot execute a block-off process by itself for a failure detected therein, CH-A executes the following procedure.

(1') Another failure occurs in CH-A (because the center controller does not function, heartbeat mark updating also stops at this time.)

(2') CH-B confirms that heartbeat mark updating of CH-A has stopped.

(3') CH-B forcibly blocks off the CH-A.

The procedure following (3') is the same as that of steps (3-7 above), so that the description will be omitted here.

Next, the details of the processing in (1) and (1') is described. Hereinafter, only the NAS channel adapter will be described, but the fiber channel adapter can be processed in the same way.

Figure 9:
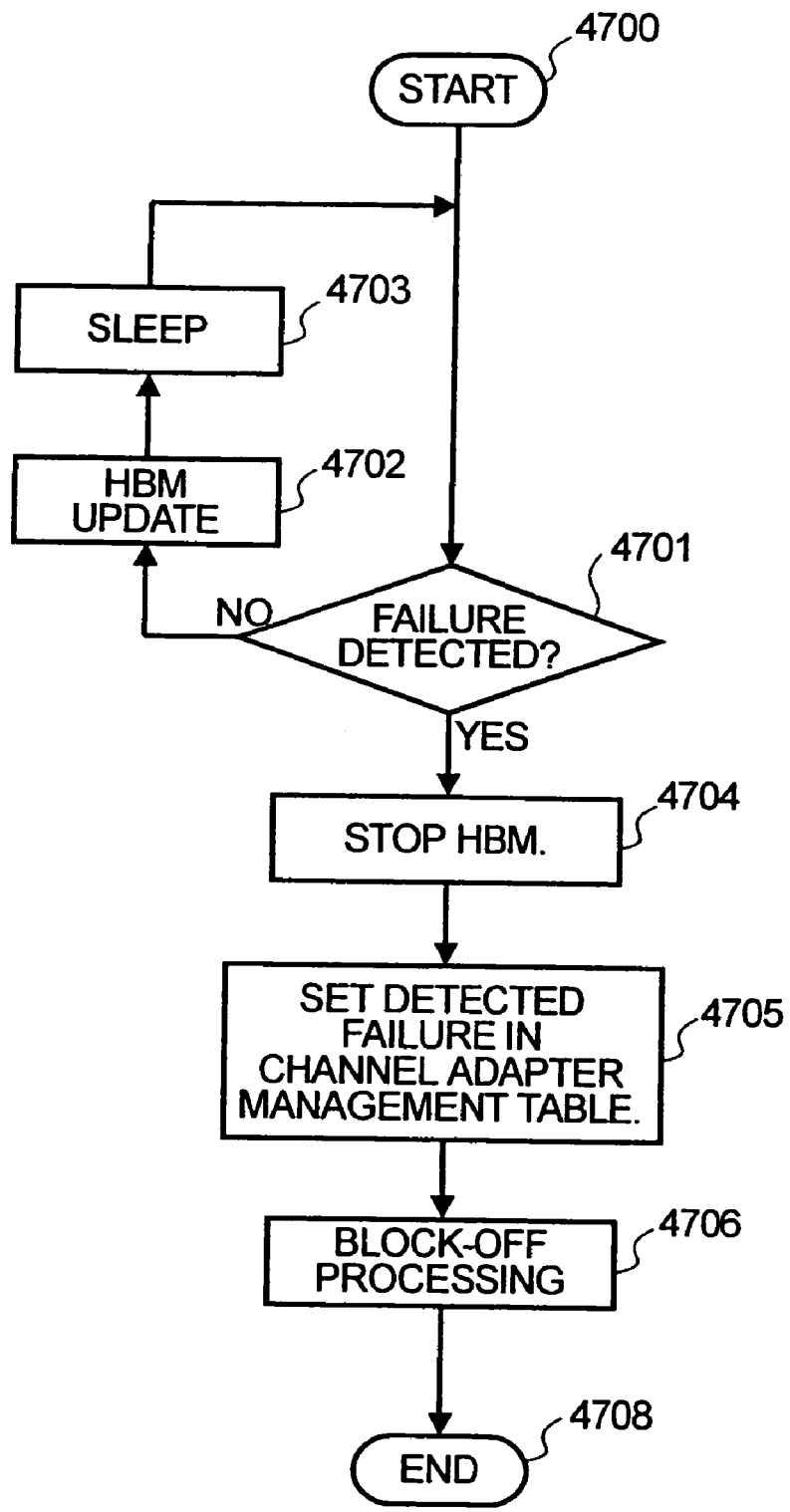
FIG. 9 is a flowchart of processing executed in both a failed channel adapter and takeover channel adapter.

FIG. 9 is a flowchart of the operation in fail-over procedure step (1) of the center controller 11001 of the NAS channel adapter CHN 1101. In this case, CHN 1101 is equivalent to CH-A. Center controller 11001 monitors failure occurrence in CHN 1101 by using a fail-over control program 110047. Center controller 11001 starts up the fail-over control program 110047 when the CHN 1101 is powered (step 4700). Center controller 11001 then decides whether or not a failure has occurred in CHN 1101 under the control of the fail-over control program 110047 (step 4701).

When no failure is detected, center controller 11001 controls processing so that the heartbeat mark is stored in heartbeat mark storing area 1312 of shared memory 13 (step 4702). After the storing (or updating) the heartbeat mark, fail-over control program 110047 stops for a fixed time (step 4703). After that, center controller 11001 repeats processing in steps 4701 to 4703.

When a failure is detected in step 4701, center controller 11001 executes the following processing. Note, however, that a hardware failure might be detected when a hardware interruption is issued to a given center controller 11001, in a step other than step 4701. Even in that case, the center controller 11001 executes the following processing.

Center controller 11001, when it is able to work, stops the updating of the heartbeat mark. Center controller 11001 can also control heartbeat mark updating to enable the heartbeat mark to include information denoting that CHN 1101 has stopped due to a detected failure (step 4704).

Center controller 11001 then sets the detected failure (failed channel adapter) in the cell equivalent to CHN 1101 in the status entry 13106 column of channel adapter management table 1310 (step 4705). After that, center controller 11001 executes block-off processing (step 4706).

When center controller 11001 is not able to work, the processing in steps 4704 to 4706 cannot be executed. If the operation of center controller 1101 is disabled, the heartbeat mark is not updated (equivalent to (1')) even when heartbeat mark updating time is reached. In this case, another channel adapter monitors the communication status of the heartbeat mark to detect a failure occurrence in the failed channel adapter (equivalent to (2)). In addition, the monitoring channel adapter executes the processing in steps 4705 and 4706, that is, the processing in (3') in place of the failed channel adapter, and, thereby, the fail-over processing is continued.

Figure 10:
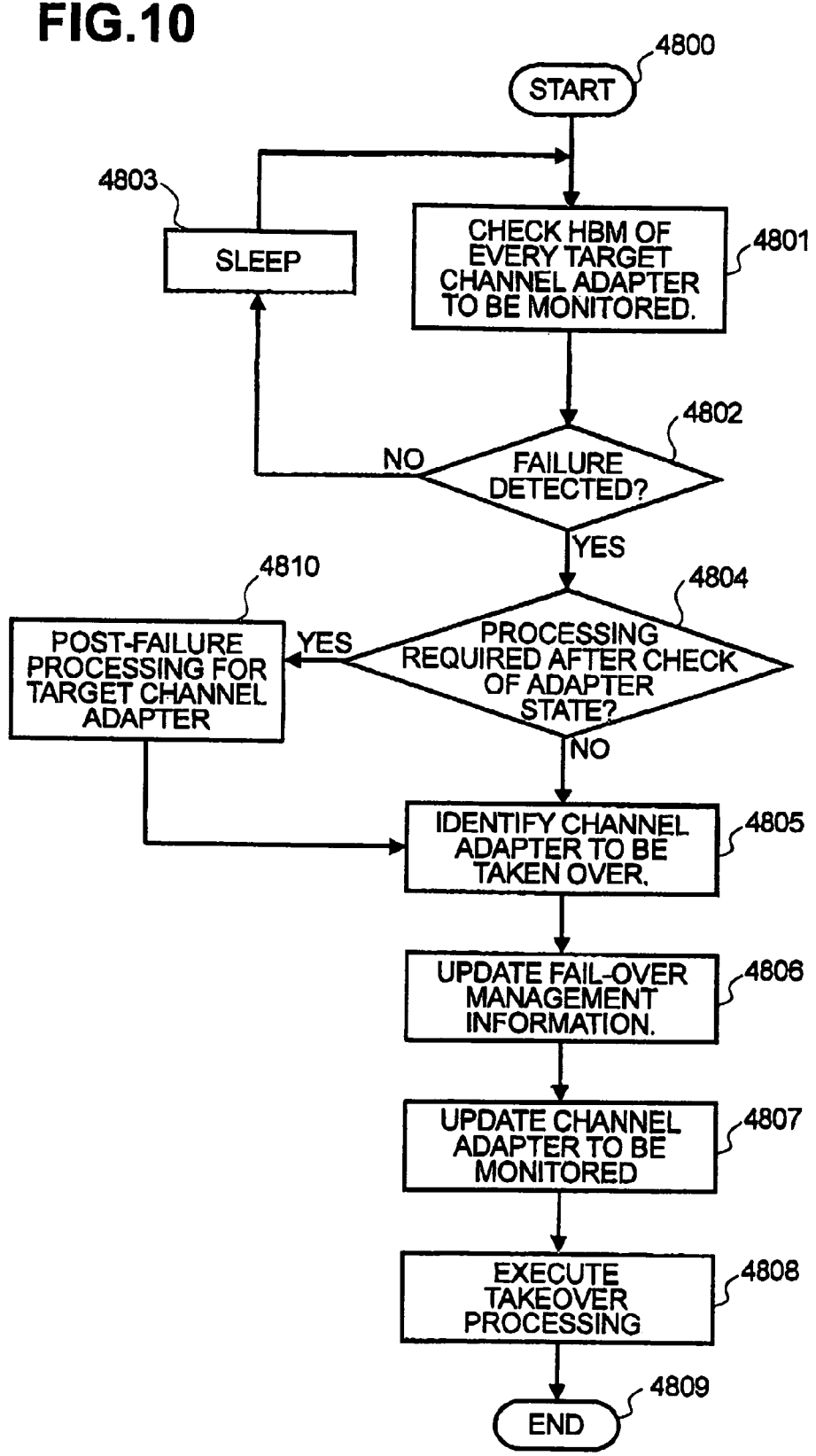
FIG. 10 is a flowchart of processing executed in both failed channel adapter and takeover channel adapter.

FIG. 10 is a flowchart of how the processing of CH-A are taken over by CH-B. Specifically, the flowchart shows the operations in (2) and (3) of NAS channel adapter CHN 1102.

When CHN 1102 is powered, its center controller 11001 starts up fail-over control program 110047 (step 4800). Center controller 11001 monitors failure occurrence in the target channel adapter in the same fail-over group by checking the heartbeat mark of the target channel adapter (CHN 1101 in this case). A "monitoring target channel adapter" means another channel adapter assigned to a first channel adapter to be monitored by that channel adapter. Such a monitoring target channel adapter is registered in fail-over management information 1311 stored in shared memory 13. Each target channel adapter is set at the factory when the product is delivered or it is set freely by the user through a software program pre-installed in the product.

Where the heartbeat mark of such a target channel adapter of monitoring is not updated, even at the predetermined updating time, or when it is confirmed that a failure occurrence code is described in the heartbeat mark, center controller 11001 decides that a failure has occurred in the target channel adapter (steps 4801 and 4802). When no failure is detected, center controller 11001 sleeps for a predetermined time (steps 4802 and 4803), then repeats processing in steps 4801 to 4803.

If a failure is detected, center controller 11001 checks the state of the failed channel adapter, that is, the state of CHN 1101 (step 4804). When no block-off processing is executed for CHN 1101, that is, when CHN 1101 is in the state of (1'), CHN 1102 executes post-failure processing in place of CHN 1101. Post-failure processing means that instead of center controller 11001 of the failed channel adapter, a normal channel adapter has detected a failure; sets the failure occurrence (failure state) in the status column of channel adapter management table 1310, in the cell corresponding to the failed channel adapter; and forcibly blocks off the failed channel adapter. This processing is equivalent to the processing in (3')(step 4810).

After that, center controller 11001 identifies the subsidiary channel adapter whose processing is to be taken over. Information about the subsidiary channel adapter is stored in fail-over management information 1131.

A subsidiary channel adapter means a channel adapter assigned to another channel adapter so that the other channel adapter takes over the processing of the subsidiary channel adapter when a failure is detected in the subsidiary channel adapter. For example, when CHN 1101 is assigned as a subsidiary channel adapter of CHN 1102, CHN 1102 takes over the processing of CHN 1101 when a failure is detected in CHN 1101. The subsidiary channel adapter is not only the channel adapter that has failed, but also another channel adapter whose processing had been taken over by the channel adapter that has failed. In such a case, a channel adapter, when it takes over the processing of another channel adapter, is also required to take over the processing of every channel adapter. As a result, center controller 11001 checks the presence of the channel adapter with reference to fail-over management information 1311.

In this embodiment, it is assumed that CHN 1101 is assigned as a subsidiary channel adapter of CHN 1102. Consequently, center controller 11001 identifies CHN 1101 as a subsidiary channel adapter in this step. How such a subsidiary channel adapter is checked is described later (step 4805). Center controller 11001 updates the information included in fail-over management information 1311. How the information the information is updated is described later (step 4806).

Center controller 11001 updates each monitoring target channel adapter. This is because updating the information in fail-over management information 1311 might cause assignment of another NAS channel adapter that must be monitored. How the information is updated is described later (step 4807). Center controller 11001 of CHN 1102, which has detected a failure in CHN 1101 a monitored subsidiary channel adapter of CHN 1102, takes over the processing of CHN 1101 in the following procedure.

Center controller 11001 obtains from fail-over information storing area 1313 of shared memory 13, the fail-over information related to the failed CHN 1101. Center controller 11001 then sets both the MAC and IP addresses of LAN controller 11002 of failed CHN 1101 in the LAN controller 11002 of CHN 1102. As a result, CHN 1102 can respond to both the LAN access to CHN 1101 and the LAN access to CHN 1102. Center controller 11001 then mounts a file system mounted in CHN 1101 in CHN 1102 according to the device information and the mount point information related to file system 110043 of CHN 1101. Center controller 11001 replays the journal as a recovery processing of the file system. After that, center controller 11001 opens the recovered file system at a predetermined export point according to the export information of network file system 110044. Center controller 11001 takes over any unfinished processing that was requested of CHN 1101 by a NAS client, as needed (step 4808). This completes the fail-over processing (step 4809). After that, center controller 11001 restarts the monitoring in step 4800.

Figure 11:
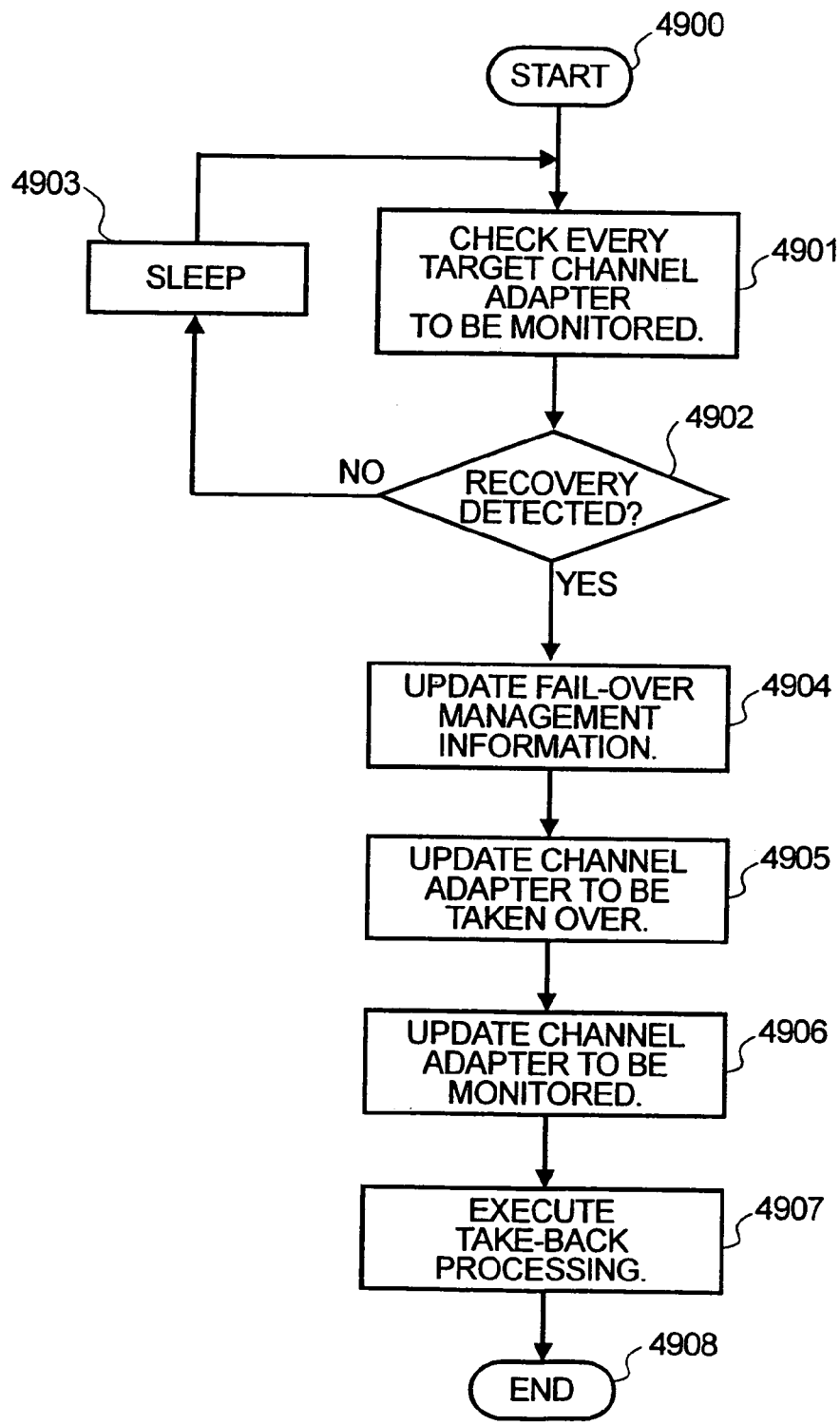
FIG. 11 is a flowchart of processing executed in both the recovered and takeover channel adapters.

FIG. 11 is a flowchart of recovery processing in a channel adapter that takes over (CHN 1102 in this case) the processing of a failed channel adapter, that is, operations (6) and (7). At first, center controller 11001 starts the recovery processing (step 4900). Center controller 11001 checks the heartbeat mark of every monitoring target channel adapter (step 4901). This processing is the same as that in step 4801. Confirming the recovery of the failed channel adapter (CHN 1101 in this case), center controller 11001 executes the processing in and after step 4904 (step 4902). When not confirming a recovery, center controller 11001 sleeps for a predetermined time (step 4903), then repeats the processing in steps 4901 to 4903.

Center controller 11001 then updates fail-over management information 1311 to eliminate CHN 1101 from the fail-over processing (step 4904). How the information 1311 is updated is described later. Center controller 11001 updates the target channel adapter of fail-over processing. That is, center controller 11001 updates the necessary information to eliminate the recovered channel adapter from fail-over processing.

Where CHN 1102 takes over not only the processing of CHN 1101, but also the processing of another NAS channel adapter, which had been taken over by CHN 1101, center controller 11001 can eliminate the channel adapter from fail-over processing. In this case the process is as follows. First, CHN 1101 fails and CHN 1102 takes over the processing of CHN 1101. Then, CHN 1102 fails and CHN 1103 takes over the processing of both CHN 1102 and CHN 1101. If CHN 1102 is recovered after that, CHN 1103 can exit the processing of both CHN 1102 and CHN 1101 (step 4905). How the necessary information in such a case is updated is described in detail, later, with reference to FIGS. 12 through 14.

Center controller 11001 updates the monitoring target channel adapter. This is because the monitoring target channel adapter might also be changed due to the updating of the fail-over management information, etc.(step 4906). Center controller 11001 then executes take-back processing. "Take-back processing" means processing that returns fail-over processing to the original NAS channel adapter. That is, fail-over information taken over in fail-over processing is returned to the recovered channel adapter (step 4907). This completes recovery processing (step 4908). If there is another NAS channel adapter whose processing is to be taken over by CHN 1102, the above processing steps are repeated again.

Figure 12:
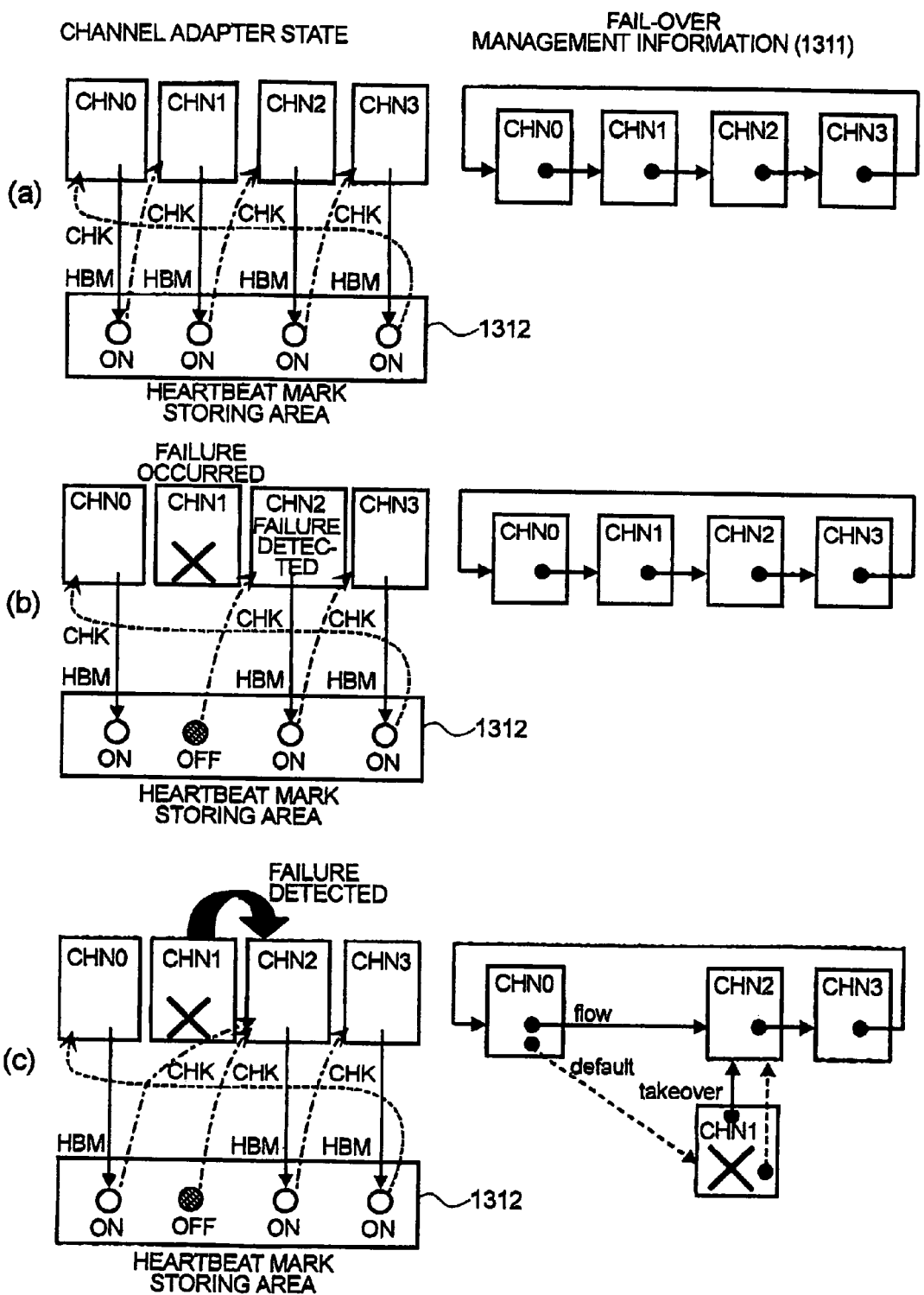
FIGS. 12 through 14 are examples of fail-over operations.
Figure 13:
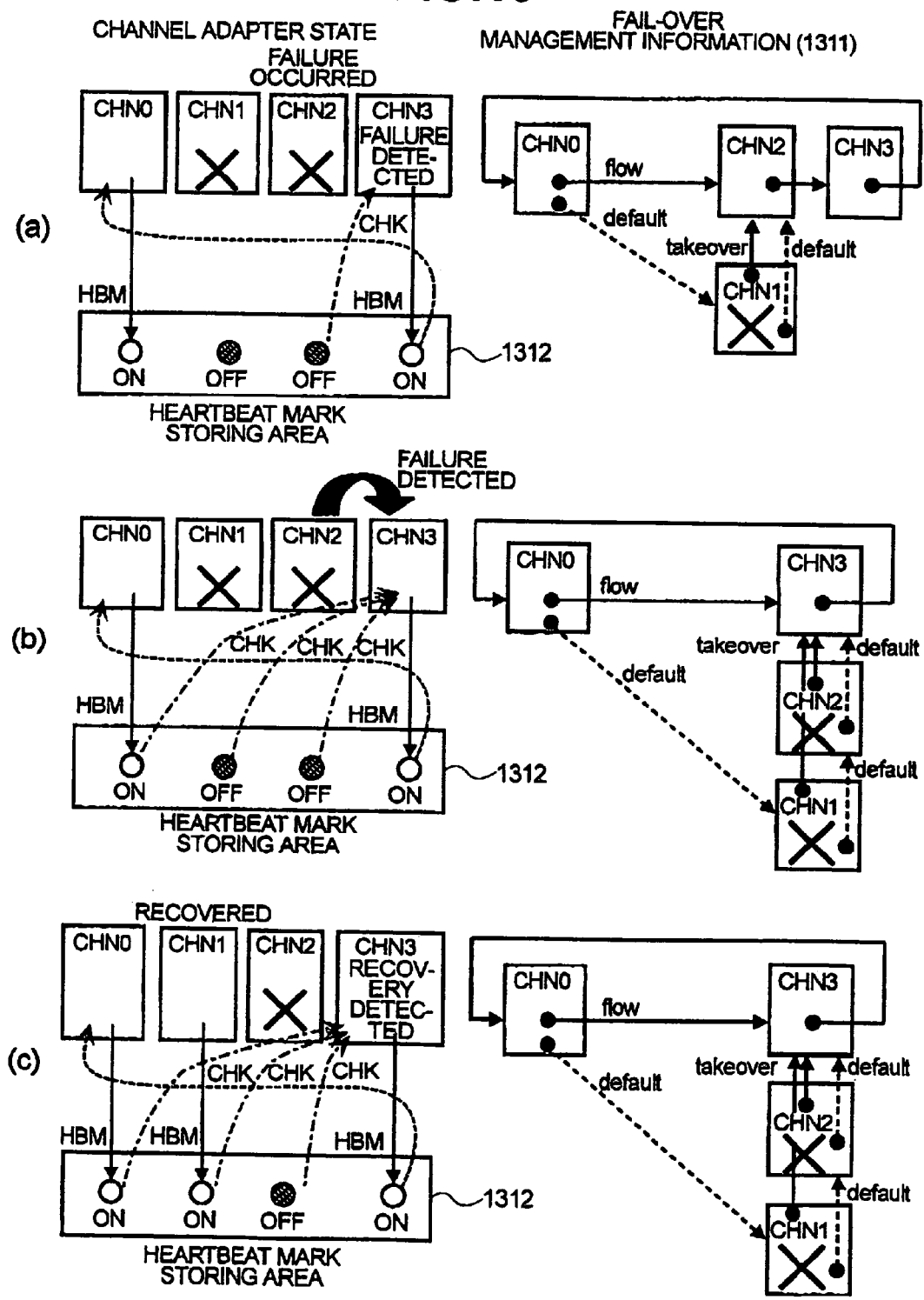
Figure 14:
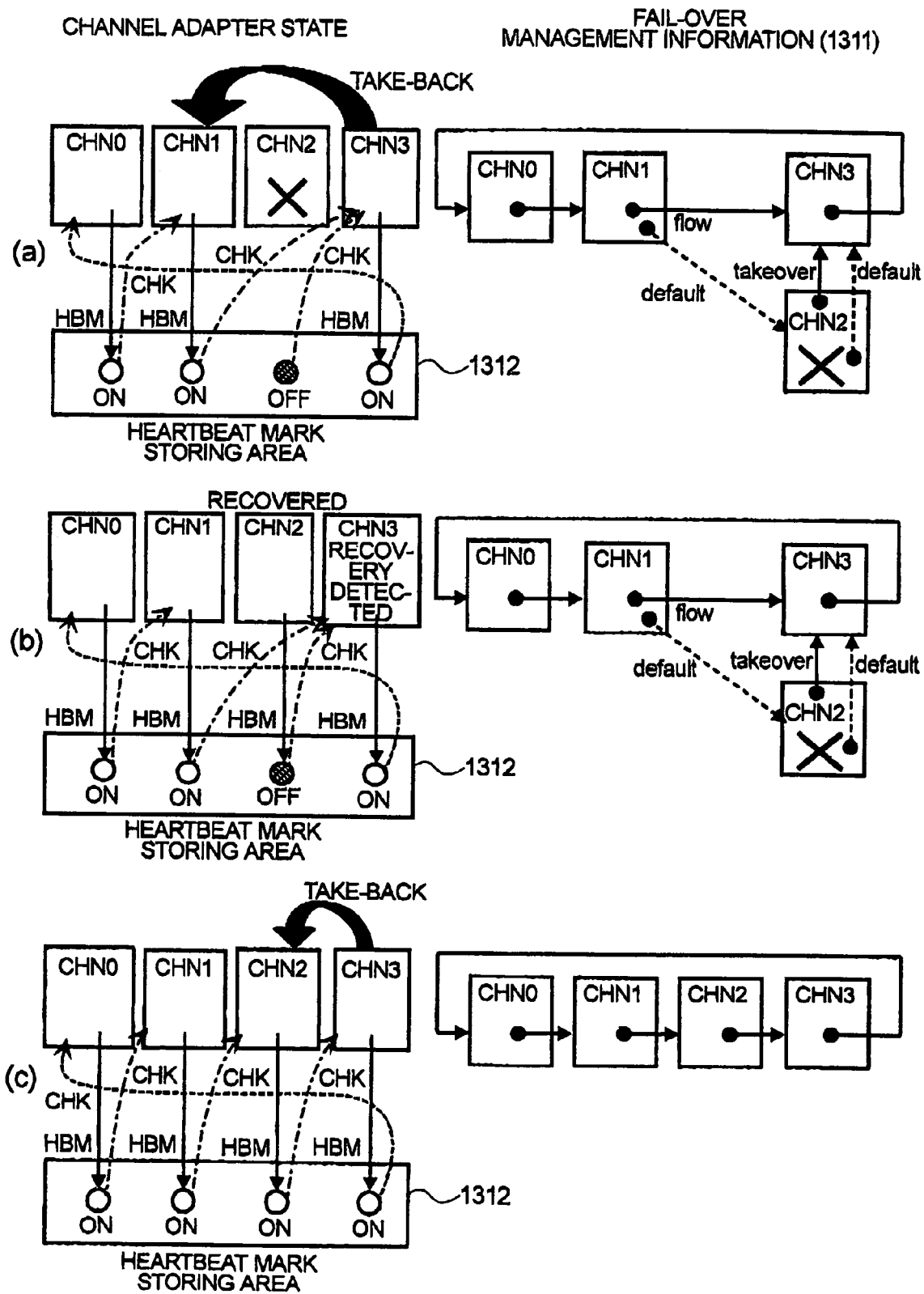

FIGS. 12 to 14 show concrete examples of a series of fail-over processes. In the examples, there are four NAS channel adapters (CHN 0, CHN 1, CHN 2, and CHN 3) in fail-over group FOG-LN0 of domain DOM-LAN0, and two of the channel adapters, CHN 1 and CHN 2, have failed consecutively. The right portion of FIG. 12(*a*) shows that each CHN is operating normally. Each CHN periodically updates its heartbeat mark (HBM) stored in heart beat mark storing area 1312 (an HBM being periodically updated is shown as ON). In this case, the contents of the fail-over management information are as shown in the left portion of FIG. 12(*a*). Actually, however, the information is stored in fail-over management information 1311 as a list as shown in the right portion of FIG. 12(*a*).

The CHN located at the arrowhead monitors the CHN at the other (round) end of the arrow. When the CHN located at the round end of the arrow fails, the CHN located at the arrowhead executes a fail-over operation (the dotted line arrow shown in the left portion of FIG. 12(*a*) also denotes the same relationship). For example, the CHN 1 monitors the CHN 0. In other words, the CHN 0 is a target channel adapter to be monitored by CHN 1. The relationship denoted by this arrow is referred to as a "current" relationship.

FIG. 12(*b*) shows that the CHN 1 has failed. When CHN 1 fails, updating of the heartbeat mark of CHN 1 stops (the HBM updating stopped state is shown as OFF). CHN 2 then detects the HBM updating has stopped. Fail-over management information 1311 shown in the right portion of FIG. 12(*b*) is not updated at this time.

FIG. 12(*c*) shows that the CHN 2 has taken over the processing of CHN 1. In the fail-over management information, before the fail-over is completed, the channel adapter that has taken over the processing of CHN 1 (hereinafter, the takeover channel adapter) is set as CHN 1. As a result, CHN 2, which detected the failed CHN 1 identifies CHN 1 as a subsidiary channel adapter, then updates fail-over management information 1311 as shown in the right portion of FIG. 12(C).

The right portion of FIG. 12(*c*) shows that CHN 1 becomes a subsidiary channel adapter of CHN 2, thereby its processing is taken over by CHN 2 (as denoted by the solid, upward arrow in the figure). The relationship denoted by this upward arrow is referred to as a "takeover" relationship. Such a "current" relationship of is set between CHN 0 and CHN 2. This means that CHN 1 is added to the target channel adapters to be monitored by CHN 2. On the other hand, the "current" relationship between CHN 0 and CHN 1 and the one between CHN 1 and CHN 2 are respectively updated to a default relationship (as shown by a dotted arrow in the figure). The take-over relationship denoted by a solid line indicates an "active" relationship that both channel adapters are monitoring each other (or taking over). On the other hand, the dotted line denotes an "inactive" relationship. An inactive relationship indicates that none of the monitoring and taking-over is carried out between the subject channel adapters. Because of updated fail-over management information 1311, CHN 2 comes to have two active relationships of "takeover" and "current." As a result, CHN 2 monitors two channel adapters (CHN 1 and CHN 0), as shown in the left portion of FIG. 12(*c*).

FIG. 13(*a*) shows that CHN 2 has failed. When CHN 2 fails in this way, updating of the heartbeat mark (HBM) of CHN 2 stops. CHN 3 then detects that CHN 2 heartbeat mark updating has stopped. Fail-over management information 1311 shown in the right portion of FIG. 13(*a*) is not updated at this time.

FIG. 13(*b*) shows the state of CHN 3, which has taken over the processing of CHN 2. In fail-over management information 1311, before the taking-over is completed, CHN 3 is set as the takeover channel adapter of CHN 2. As a result, CHN 1103, which detected the failure of CHN 2, identifies CHN 2 as a target channel adapter and updates fail-over information 1311, as shown in the right portion of FIG. 13(*b*). The right portion of the figure also shows that failed CHN 2 becomes a subsidiary channel adapter of CHN 3, and CHN 1, which is a subsidiary channel adapter of the CHN 2, also becomes as a subsidiary channel adapter of CHN 1103; thus, the processing of both CHN 1 and CHN 2 are taken over by CHN 3 (as denoted by the solid, upward arrow in the figure). In other words, a takeover relationship is set between CHN 1 and CHN 3, as well as between CHN 2 and CHN 3. In the meantime, the takeover relationship between CHN 1 and CHN and the "current" relationship between CHN 0 and CHN 2 are reset. Then, a new "current" relationship is set between CHN 0 and CHN 3. In addition, the "current" relationship between CHN 2 and CHN 3 is updated to default. The default relationship between CHN 0 and CHN 1 and the one between CHN 1 and CHN 2 are kept as they are.

Due to the updating of fail-over management information 1311 as described above, CHN 3 comes to have three active relationships (two takeover relationships and one "current" relationship). As a result, CHN 3 monitors three channel adapters (CHN 1, CHN 2, and CHN 0), as shown in the left portion of the figure.

FIG. 13(*c*) shows the state of CHN 1 recovered from a failure. When CHN 1 has been recovered, updating of the heartbeat mark (HBM) of CHN 1 restarts. CHN 3 then detects this restarted CHN 1 HBM updating. Fail-over management information 1311 shown in the right portion of FIG. 13(*c*) is not updated at this time.

FIG. 14(*a*) shows the state of CHN 1 after the processing is returned from the CHN 3 thereto. In the fail-over management information before CHN 1 was recovered, CHN 3 was set as the takeover channel adapter of CHN 1. As a result, CHN 3, which detected the recovered CHN 1, updates fail-over management information 1311 as shown in the right portion of FIG. 14(*a*) As shown in the figure, the takeover relationship between CHN 1 and CHN 3 is reset from CHN 1. The default relationship between CHN 1 and CHN 3 is updated to a "current" relationship. In addition, the relationship between CHN 0 and CHN 1 is updated from default to "current". This means that processing is returned (taken back) from CHN 3 by CHN 1. Furthermore, the "current"[flow] relationship between CHN 0 and CHN 3 is reset. The relationship between CHN 2 and CHN 3 is kept as is at this time.

Due to the updating of fail-over management information 1311 as described above, CHN 3 comes to have two active relationships (one takeover relationship and one "current" relationship). As a result, CHN 3 monitors two channel adapters (CHN 1 and CHN 2), as shown in the left portion of in FIG. 14(*a*).

FIG. 14(*b*) shows the state of CHN 2 recovered from a failure. When CHN 2 is recovered, updating of the heartbeat mark (HBM) of CHN 2 restarts. CHN 3 then detects this restarted CHN 2 HBM updating. Fail-over management information 1311 shown in the right portion of the figure is not updated at this time.

FIG. 14(*c*) shows the state of CHN 1102 after processing is returned from CHN 3 thereto. In the fail-over management information before CHN 2 was recovered, CHN 1103 was set as the takeover channel adapter of CHN 2. As a result, CHN 3, which detected the recovered CHN 1102, updates fail-over management information 1311 as shown in the right portion of FIG. 14(*c*). As shown in the figure, the take-over relationship between CHN 2 and CHN 3 is reset from CHN 2. The default relationship between CHN 2 and CHN 3 is updated to a "current" relationship. In addition, the relationship between CHN 1 and CHN 2 is updated from default to current. This means that processing is returned (taken back) from CHN 3 to CHN 2. Furthermore, the "current" relationship between CHN 1 and CHN 3 is reset. Updating of the above relationships restores the state shown in FIG. 12(*a*).

According to this embodiment, it is possible to use a channel adapter provided with various kinds of block I/O interfaces and a channel adapter provided with various kinds of file I/O interfaces together in one storage system; thus, the storage system can be connected to a plurality of network domains. In addition, it is possible to compose a proper fail-over group in such a system configuration so that the processing by multiple channel adapters in the fail-over group can be taken over by a normal channel adapter even if consecutive failures occur in the group.

Although, in this embodiment, a channel adapter to be monitored is the same as that from which processing is to be taken over, the channel adapter to be monitored may be different from the channel adapter from which processing is to be taken over. For example, it is possible to configure the system so that CHN 2 monitors CHN 1, but CHN 3 takes over the processing of CHN 1. However, note that information must be exchanged between CHN 2 and CHN 3 in such a system configuration. This required processing will be described later.

In the embodiment as described above, the storage system 1 chooses a takeover channel adapter statically according to predetermined fail-over management information. However, when one channel adapter takes over the processing of multiple channel adapters (fail-over), the usage ratio of the takeover channel adapter will become very high.

To avoid the problem, the present invention provides a variation of this embodiment. Specifically, the storage system itself collects and records the operating ratio of each channel adapter and selects the channel adapter whose operating ratio is the lowest in the same fail-over group as a takeover channel adapter. The storage system then enables the takeover channel adapter to take over the processing of each channel adapter that has failed.

Moreover, both takeover and monitor relationships defined in the above embodiment shown in FIG. 12(*b*) are modified. That is, an arrow line in FIG. 12B does not represent any takeover relationship, but represents only a relationship between the channel adapters so that one channel adapter monitors failure occurrence in the other channel adapter.

Furthermore, each channel adapter measures the operating ratio of its center controller 11001 and periodically stores the result in channel adapter management table 1310. Specifically, an idle process is executed when the center controller 11001 has no work to execute. The interval in which the idle process is executed is measured for a certain time, thereby calculating the operating ratio of center controller 11001 in a fixed period. The fixed period may be any value, but it should preferably be a time interval to which the measurement overhead is added so as to become larger enough with respect to the processor clock, for example, about 1 second.

A takeover channel adapter is identified as follows. A channel adapter monitors heart beat mark area 1312, just as in the above embodiment, to detect a channel adapter that has failed, which is a target channel adapter to be monitored. The channel adapter that has detected the failed channel adapter refers to channel adapter management table 1310 to identify the channel adapter whose operating ratio is the lowest at that time among the normal channel adapters in the same fail-over group. Then, the channel adapter that detected the failed channel adapter selects the channel adapter whose operating ratio is the lowest as the takeover channel adapter. After that, the channel adapter that detected the failed channel adapter updates fail-over management information 1311. A takeover relationship is thus set between the failed channel adapter and the NAS channel adapter selected as the takeover channel adapter. The monitoring relationships of default and "current" are the same as those shown in FIG. 12.

The monitoring channel adapter sends a signal to the channel adapter selected as the takeover channel adapter. Receiving the signal, the takeover channel adapter refers to fail-over management information 1311 to ascertain that it has become the takeover channel adapter of the failed channel adapter. After that, the takeover channel adapter executes fail-over processing as described above.

According to this embodiment, concentration of the load on the takeover channel adapter can be avoided.

Although a takeover channel adapter is chosen according to the operating ratio at a certain time as described above, such a takeover channel adapter may also be selected so that the load of the takeover channel adapter is dispersed over a long period according to the recorded variation of the operating ratio over time, etc. In this case, the effect of the load balance will become more significant for a system with a load that varies with time.

There are also other methods that employ the operating ratio to select a takeover channel adapter. For example, there is a fail-over method to average the number of clients connected per channel adapter, a fail-over method to average the number of disks to be accessed per channel adapter, etc.

The present invention, therefore, provides a storage system that can employ various kinds of interfaces conforming to the standards of both NAS and SAN. As a result, the system configuration is more adaptable, and system configuration varied more freely to reduce management costs. It is also possible to provide a storage system with excellent resistance to multiple failures occurring in multiple interfaces conforming to the standards of both NAS and SAN.

What is claimed is:

1. A storage system comprising:
   a plurality of slots adapted for use with different kinds of interface controllers, including at least a block I/O interface controller and a file I/O interface controller, said slots having the same shape;
   a disk controller comprising:
      a plurality of first interface controllers and a plurality of second interface controllers, wherein some of said first interface controllers are coupled to a network managed in a first domain and others of said first interface controllers are coupled to a network managed in a second domain;
      a disk adapter coupled to said first and second interface controllers;
      a cache memory coupled to said first and second interface controllers and to said disk adapter;
      a first fail-over controller for transferring processing from a source interface controller to a destination interface controller upon failure of said source interface controller, wherein said source interface controller and said destination interface controller are included among said first interface controllers and are coupled to a network managed in the same domain;
      a second fail-over controller for transferring processing of said destination interface controller to another interface controller included among said first interface controllers, when said destination interface controller fails; and
      a storage unit coupled to said disk controller,
   wherein said each interface controller determines the status of other interface controllers based at least on heartbeat mark information generated within the storage system.

2. A storage system comprising:
   a plurality of slots adapted for use with different kinds of interface controllers, including at least a block I/O interface controller and a file I/O interface controller, said slots having the same shape;
   a disk controller comprising:
      a plurality of first interface controllers and a plurality of second interface controllers, wherein each of said first and second interface controllers includes:
         an input for receiving heartbeat mark information generated within the storage system; and
         a memory for storing the received heartbeat mark information,
         wherein said each interface controller determines the status of other interface controllers based at least on the stored heartbeat mark information;
      a disk adapter coupled to said first and second interface controllers; and
      a cache memory coupled to said first and second interface controllers and to said disk adapter.

3. A storage system comprising:
   a plurality of slots adapted for use with different kinds of interface controllers, including at least a block I/O interface controller and a file I/O interface controller, said slots having the same shape;
   a disk controller comprising:
      a plurality of first interface controllers and a plurality of second interface controllers, wherein some of said first interface controllers are connected to a network managed in a first domain and others of said first interface controllers are connected to a network managed in a second domain;
      a disk adapter connected to said first and second interface controllers;
      a cache memory connected to said first and second interface controllers and to said disk adapter;
      a first fail-over controller for transferring processing from a source interface controller to a destination interface controller upon failure of said source interface controller and, wherein said source interface controller and said destination interface controller are included among said first interface controllers and are coupled to a network managed in the same domain; and
      a second fail-over controller for transferring processing of said destination interface controller to another interface controller included among said first interface controllers, when said destination interface controller fails; and
   a storage unit coupled to said disk controller,
   wherein said first fail-over controller selects an interface controller with a lowest operating ratio among said first interface controllers and transfers processing of said destination interface controller to said selected interface controller.

4. A method for storing data comprising:
   receiving data at a plurality of interfaces wherein each interface is associated with an interface controller;
   transferring data received at an interface to its associated interface controller;
   processing the received data at the associated interface controller to store the received data in a storage unit;
   generating a heartbeat mark for each interface controller;
   updating the heartbeat mark for each interface controller at fixed intervals;
   determining, at each interface controller, the status of other interface controllers based at least on the heartbeat marks; and
   transferring processing from an interface controller to another interface controller based on the determined status.

5. A method for storing data comprising:
   receiving data at a plurality of interfaces wherein each interface is associated with an interface controller;
   dividing the interface controllers into a first group and a second group wherein some interface controllers in the first group are coupled to a network managed in a first domain and other interface controllers in the first group are coupled to a network managed in a second domain;
   transferring data received at an interface to its associated interface controller;
   processing the received data at the associated interface controller to store the received data in a storage unit;
   identifying a failed interface controller in the first group of interface controllers;
   transferring processing from the failed interface controller to a target interface controller in the first group of interface controllers that is part of a network managed in the same domain as the failed interface controller and that has the lowest operating ratio available;

identifying a failure in the target interface controller; and
transferring processing from the failed target interface controller to another target interface controller in the first group of interface controllers that is part of a network managed in the same domain as the failed target interface controller and that has the lowest operating ratio available.

6. A storage system comprising:

a plurality of slots adapted for use with different kinds of interface controllers, including at least a block I/O interface controller and a file I/O interface controller, said slots having the same shape;

a disk controller, comprising a plurality of first interface controllers and a plurality of second interface controllers;

a disk adapter connected to said first and second interface controllers; and a storage unit connected to said disk controller, wherein said each interface controller determines the status of other interface controllers based at least on heartbeat mark information generated within the storage system.

* * * * *